United States Patent

[11] 3,577,875

[72] Inventors Georges Stcherbatcheff
 Paris;
 Claude Houdet, Besancon, France
[21] Appl. No. 791,330
[22] Filed Jan. 15, 1969
[45] Patented May 11, 1971
[73] Assignee Societe de Recherches en Matiere de
 Micromoteuss Electriques Socrem
 Paris, (Seine), France
[32] Priority Jan. 17, 1968
[33] France
[31] 136,305

[54] CLOCKWORK MOVEMENT CASED BY A ROTARY STEPPING ELECTRIC MOTOR HAVING TWO MOTIVE PHASES SUCCEEDING ONE ANOTHER IN TIME
7 Claims, 6 Drawing Figs.

[52] U.S. Cl. ................................................. 58/28,
 58/116
[51] Int. Cl. ....................................................... G04c 3/04
[50] Field of Search .......................................... 310/164;
 58/23, 26.5, 26.6, 28 (A, B, D), 29, 32, 116

[56] References Cited
UNITED STATES PATENTS
3,134,220  5/1964  Miesner ........................ 58/28

Primary Examiner—Richard B. Wilkinson
Assistant Examiner—Edith C. Simmons
Attorney—William Anthony Drucker ABSTRACT: The invention broadly relates to clockwork movements controlled by an electric motor. More particularly, the instant invention provides a clockwork movement which avoids the use of a power storage spring, said clockwork movement including a rotary stepping motor having a static torque with motive effect for any angular position of its rotor in which the torque due to the current is annuled upon change of sign.

A synchronism between the running of the escapement and that of the motor may then be obtained, provided that gear means, connecting the motor to the escape wheel, have such a ratio that a half-step of the escape wheel corresponds to one step of the motor.

Patented May 11, 1971  3,577,875

CLOCKWORK MOVEMENT CASED BY A ROTARY STEPPING ELECTRIC MOTOR HAVING TWO MOTIVE PHASES SUCCEEDING ONE ANOTHER IN TIME

The invention relates to the clockwork movements controlled by an electric motor.

These movements generally constitute what is known as "rewinding systems." In other words, the energy necessary for the operation of the escapement is not directly supplied by the motor, but by a spring, or any other component adapted for accumulating a reserve of energy. It is when this reserve of energy is exhausted that the motor is energized by a suitable switching device, in order to supply energy to the spring. In these known systems, there is obviously no synchronism between the running of the escapement and that of the motor. In general, the rewinding motor is a synchronous rotary stepping motor of current type. However, it has been proposed to use an oscillating motor comprising two motive phases succeeding one another in time, the first under the effect of a current applied to the field coils of the motor and the second, under the effect of a static torque due to the presence, inside the motor, of means for generating a permanent magnetic flux.

This latter known solution also necessitates the use of an energy storage component, and it is an important object of the invention to avoid the use of such a storage device.

The invention is based on the use of a rotary stepping motor having particular properties, namely two motive phases succeeding one another in time one under the effect of the current, the other under the effect of a static torque, the design of the motor being such that its static torque had a motive effect for any angular setting of its rotor in which the torque due to the current is annulled upon change of sign.

It is then possible, for a suitable angular adjustment of the rotor with respect to the escape wheel and for a gear ratio such that a half-step of the escape wheel corresponds to one step of the motor, to obtain the synchronism between the running of the escapement and that of the motor and to eliminate said storage component, the motor itself ensuring, by its magnetic static torque, the various functions usually fulfilled by the rewinding means. This results in a considerable simplification of the device, and in addition a regularity of the pressure exerted on the escapement and a constancy of the motive torque. Rotary motors having the particular properties mentioned above are known per se. In b;; such a motor has been described in Stcherbatcheff Pat. application Ser. No. 495,642 now issued as U.S. Pat. No. 3,469,133 filed in U.S.A. on Oct. 13, 1965 under Ser. No. 495,642. The clockwork movement according to the invention thus essentially comprises the usual escape wheel which cooperates, in a manner known per se, with a lever associated with a coil spring-balance system, an electric motor, switching means for switching the supply source of the motor and a connection gear between the motor and the escape wheel, and is mainly characterized in that the electric motor is of a rotary type which possesses the particular properties mentioned above, in that said connection gear has a ratio such that a half-step of the escape wheel corresponds to a step of the motor, and in that said switching means are arranged in order to effect the switching on and switching off of the source of supply at instants when the rotor of the motor occupies angular positions for which the torque due to the current changes sign.

These and other features and advantages of the invention will clearly appear from the following description. In the accompanying drawings:

FIG. 1 shows a clockwork movement according to an embodiment of the invention, in which the switching component is of the commutator type.

FIG. 1a diagrammatically illustrates a motor adapted for operation in the said clockwork movement.

Figure 1:
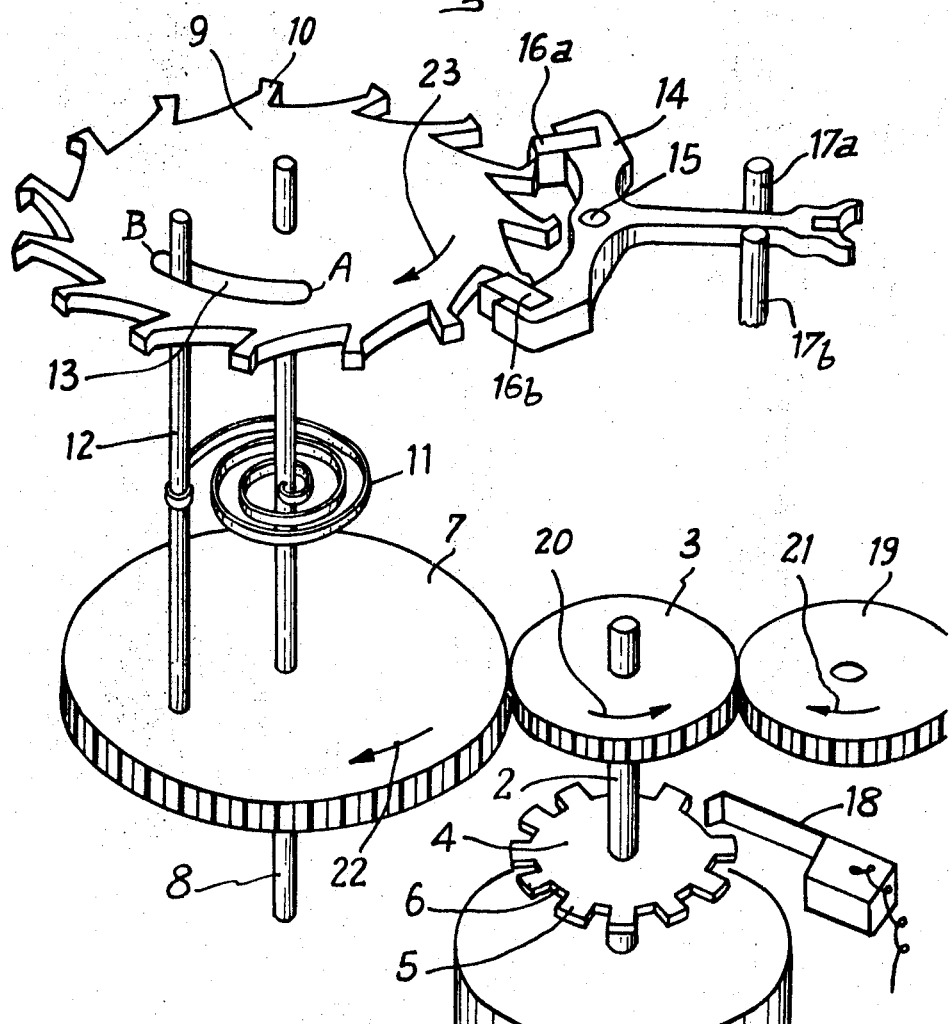

Referring more particularly to FIG. 1, the reference numeral 1 designates a motor on whose shaft are attached a gear pinion 3 and a commutator 4 constituted of a conductor disc.

This disc is stamped out on its edges, so as to present a certain number N of teeth 5 separated by isolating notches 6. The pinion 3 engages with another pinion 7 mounted idly on a shaft 8 on which is fixed an escape wheel 9 comprising a certain number M of teeth 10.

In the embodiment described, the mechanical coupling between the pinion 7 and the wheel 9 is effected by means of the coil spring 11 fixed, by one of its ends, to the shaft 8 and, by its other end, to a rod 12. This rod is arranged parallel with respect to the shaft 8 and crimped by one of its ends in the pinion 7. Its other end engages without friction in a circular aperture 13 provided in the wheel 9. Said wheel maintains the movement of a system constituted of a lever 14 associated with a coil spring-balance system (not shown). This lever is movable about an axis 15 and comprises two blades 16a and 16b, the amplitude of its oscillating motion is limited by lugs 17a and 17b.

Moreover, a brush 18, connected to a DC supply source, energizes the motor field when its end comes into contact with a tooth, such as 5, of the commutator 4. When the end of the brush is situated opposite a notch 6 of the commutator 4, it is not in contact with the conductive parts of the commutator and the motor is not energized. Finally, the pinion 3 also mates with a pinion 19, this being an element of a gear train, which conducts to the hands of the clock (not shown) of which the device described constitutes the motor.

The device operates in the following manner: the motor 1 is of the type as defined hereinabove. It rotates therefore under the effect of the electric current whilst it is fed by means of the brush 18. When the end of the brush 18 is, on the contrary, opposite a loophole 6, this feed ceases, but the motor continues to rotate under the effect of a rest torque of purely magnetic origin.

The dimensions of the teeth and of the loopholes are determined so that, if the motor were not connected to the escapement, the two motive phases would follow one another so as to bring about the continuous rotation of the motor. If the instant when the brush 18 comes into contact with a tooth 5 is considered, the motor 1 rotates and drives the pinion 3 in the direction of the arrow 20, this causing the pinion 19 to rotate in the direction of the arrow 21 and at the same time, causes the pinion 7 to rotate in the direction of the arrow 22. As the pinion 7 is mounted idly on the shaft 8, it does not drive it but on the contrary drives the rod 12 and consequently rewinds the spring 11. In fact, the end of the spring 11 fixed to the shaft 8 is fixed, since the shaft 8, securely fixed to the escape wheel 9, one tooth of which is, at this instant, blocked by the blade 16b of the lever 14, cannot rotate. At this instant, the rod 12 is, moreover, in contact with the edge B of the aperture 13.

The movement of the pinion 7 about the shaft 8 is thus possible due to the fact that the free end of the rod 12 may move without friction in the aperture 13, towards the edge B.

At the instant when the end of the brush 18 arrives at the end of the tooth 5 with which it was in contact, and thus comes above a notch 6, the motor ceases to be fed with current but, as is indicated hereinabove, it continues to rotate under the effect of its static torque until the rod 12 abuts against the edge B of the aperture. At this moment, the motor stops. The respective widths of the teeth 5 and of the notches 6 are determined as a function of the length of the aperture, in order that this stop position corresponds to a notch, so that the motor does not consume any current when in stop position.

At the end of the half-period of the balance-coil spring system, the lever 14 triggers and the blade 16b frees the escape wheel 9. This latter, whose inertia is small, is urged by the spring 11, which acts on the shaft 8 to which it is securely fixed. It rotates quickly in the direction of the arrow 23 until one of its teeth is locked by the blade 16a of the lever. This movement causes the aperture 13 to be displaced so that the free end of the rod 12 is again in contact with the edge A, so that the pinion 7 is then capable of rotating in the direction of the arrow 22 and that the motor 1 may resume its movement of rotation under the effect of the static torque. This movement is continued up to the moment when the end of the brush 18 comes into contact with a new tooth 5 and a cycle, identical to the preceding cycle, recommences.

It will be seen that this movement may continue indefinitely and intermittently, provided that there corresponds to one step of the motor the transition from the locking of the escape wheel 9 by the blade 16b to the locking of said escape wheel by the blade 16a. In other words, there corresponds to a step of the motor a half-step of the escape wheel. The numbers of teeth of the pinions 3 and 7 are in a suitable ratio for that purpose.

In the particular case where the number N of steps per revolution of the motor is equal to double the number M of teeth of the escape wheel, the above-mentioned ratio is equal to 1. The gear pinion 7 may then be eliminated and the rod 12 may be fixed directly to the pinion 3, provided that the shaft 8 is disposed in line with the shaft 2.

It will be noted that, provided that the aperture 13 is sufficiently long and that the spring 11 is, at the beginning, sufficiently wound, the motor 1 may accidentally take two or three retardation steps on the escape wheel without this stopping the operation of the mechanism. All that will happen will be that, upon starting, the motor will have to overcome a slightly less resistant torque, since the spring 11 will be less wound than it is normally, and that the motor will rotate without stopping until it has made up its retardation and that the end of the rod 12 is again in abutment at the end of the aperture 13.

It will be noted that this device has the advantage of rendering independent, from the point of view of inertia, the escape wheel 9 of the motor 1 and the gears which are connected thereto by means of the pinion 19.

It is obvious that the gear pinions 3 and 7 could be mitre gears enabling the shafts 2 and 8 to be perpendicular with respect to one another, or that the pinion 19 could be constituted of a wheel tangential to an endless screw supported by the shaft 2.

Moreover, being given that, in the type of motor used, the magnetic part of the rotor is shaped with a serrated edge provided with teeth made of soft magnetic material, the commutator 4 could be eliminated.

To this end, it would be necessary to protect these teeth by a resistant metallic coating and to cause the brush 18 to rub on said teeth, which would then act as a commutator. A simplified variation of the clockwork movement described and shown would consist in eliminating the elastic coupling (spring 11), the aperture 13 and the rod 12 and in directly connecting the escape wheel 9 and the pinion 7 to the shaft 8. It will thus be seen that the spring 11 does not play an essential role and that the system described is not of the rewinding type.

Figure 1A:
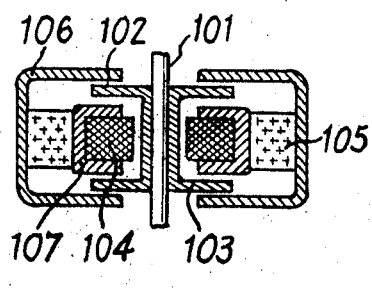

The embodiment shown in the drawing has, however, the advantage of rendering the inertia behavior of the escape wheel independent of the inertia of the other movable parts. In practice, the motor 1 is advantageously of the type described in the above-mentioned application FIG. 1a diagrammatically illustrates a motor comprising a moving armature, an axis 101 and two-pole shoes 102 and 103, and a fixed field made up of a field coil 104, a permanent magnet 105 and two-pole pieces 106 and 107 of soft magnetic material. The magnet 105 is annular, and radially polarized. The invention is however, not limited to the use of this motor, other motors having the required properties that may be designed by the man skilled in the art.

Figure 2:
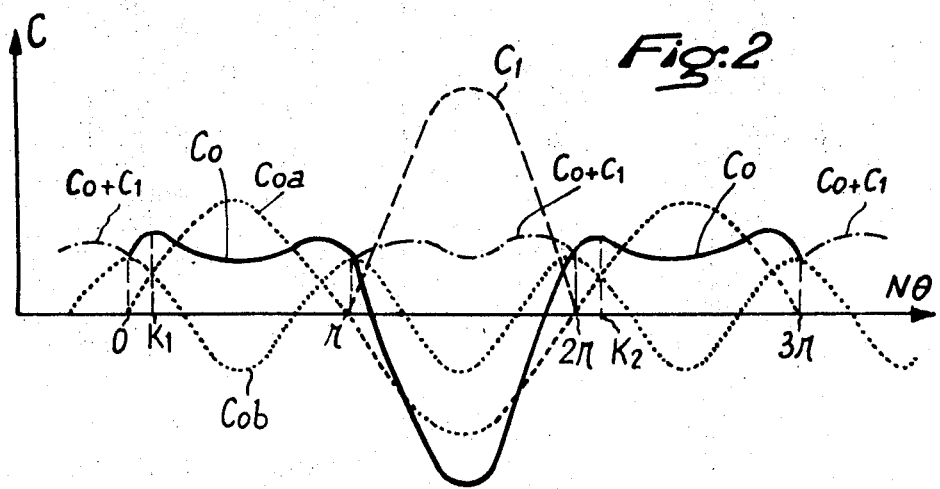
FIG. 2 shows the curves representing the torques of the motor.

FIG. 2 shows the diagram of the static torque $C_o$ (that is to say in the absence of current), of the torque $C_1$ due to the current and of the total torque $C_o+C_1$ of a motor of the type defined hereinabove. $C_1$ is the torque produced by a substantially constant energization current. The torques $C_o$ and $C_1$ correspond to a constant velocity of the motor. The diagram shows the torques as a function of $N\theta$, $\theta$ being an angle which defines the angular position of the rotor of the motor and N the number of steps that it may effect in the course of a revolution.

As was explained in the above-mentioned patent application the torque $C_o$ results from the superposition of a torque $C_o a$ at the fundamental frequency and of a torque $C_o b$ at double frequency, this result being obtained by proper dissymetrical design of the magnetic circuit of the motor. This diagram shows that such a motor is capable of starting and rotating even in the absence of energization current, and that it supplies a torque of constant sign, whose amplitude undergoes only relatively small variations.

In order to ensure the continuous rotation of a motor of this type, it is obviously sufficient to energize it at the instants corresponding to the abscissa point $\pi$, $3\pi$ etc. and to cut off the supply of current at the instant corresponding to the abscissa points 0, $2\pi$, etc. Referring to the device of FIG. 1, it may be seen that the instant when the brush 18 comes into contact with a tooth 5, may then correspond to an abscissa point $\pi$ for example: the motor is fed and rotates under the action of the torque $C_o+C_1$, up to the abscissa point $2\pi$. At this instant, the motor ceases to be fed, but continues to rotate under the action of the static torque $C_o$. This rotation continues, as has been indicated hereinabove, until the rod 12 abuts against the edge 12 of the aperture in practice, the device will preferably be produced (by adjusting the motor with respect to the escape wheel), so that this moment corresponds to the first maximum, of abscissa $K_2$, of the torque $C_o$. In fact, it is in these angular positions of the rotor that the static torque has its maximum motive effect.

The motor remains stationary in the position defined by the point $K_2$, and, this being so, without power consumption during a short interval of time (for example 200 microseconds), which terminates, as has been indicated above, in the end of the half-period of the balance-coil spring system. The motor then starts again under the action of the single torque $C_o$, up to the abscissa point $3\pi$, which corresponds to an instant when the brush 18 comes into contact with a new tooth 5.

The preceding explanation clearly shows the close relationship which exists, in the device of the invention, between the motor and the escapement. It is this latter which directly governs the instants of stopping and restarting of the motor whilst, conversely, it is the motor which rewinds the spring 11, (or if this latter is omitted, which directly drives the escape wheel) and thus supplies, in every case, the escapement with the energy necessary for its operation.

This energy is supplied by the motor at the precise instant when the escapement has to use it, whilst, in the conventional rewinding systems, it is accumulated in a spring and supplied thereby to the escapement, at the desired instant. In the device described and illustrated, the spring 11 accumulates, moreover, only a very small fraction of the energy supplied by the motor. This small fraction serves simply to start the escapement very rapidly, thus eliminating the effects of inertia of the motor.

Moreover, it will be observed that the motor supplies to the escapement the torque necessary for maintaining the rest operation of this latter, i.e., the torque which it needs when stationary, without there being any outflow of current to this end, this constituting an advantage of the invention: in fact, at no moment during the operation of the device does the source of supply discharge uselessly.

Another advantage of the invention consists in that the motor directly drives the gear train of which the minute or hour wheel forms part, whilst in the known systems, this gear train is driven by the rewinding device, this requiring the use of a relatively complex kinematic chain. In the embodiment which has just been described, and which is illustrated in FIG. 1, it is the commutator 4 which by cooperation with the brush 18, ensures the control of the feed of the motor in the suitable angular positions of the rotor of said latter. As a variation, this mechanical switching of the feed of the motor may be replaced by an electronic switching.

Figure 3:
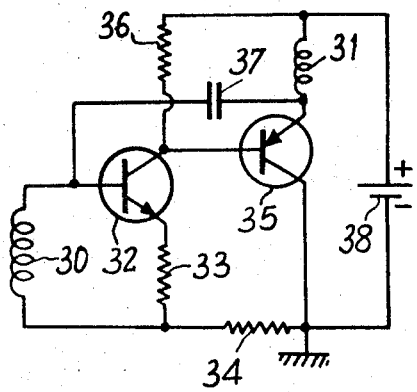
FIG. 3 is an electrical diagram of an electronic switching component of the measuring coil type.

A first embodiment of an electronic switching is illustrated in FIG. 3.

In this embodiment, in addition to its normal driving coil 30, the field of the motor comprises an auxiliary coil 31 known as "measuring coil" in which an alternating counterelectromotive force is produced each time that the motor is in rotation. In fact, in a motor of the type used in the present invention, which is polarized and monophased, it is known that the electromotive force $E_v$ is associated with the angular velocity $\omega$, with the current $i$ and with the torque $C_1$ due to the current by a relation of the type:

$$E_v = \omega \frac{C_1}{i}$$

Now, with respect to the auxiliary coil 31, the motor, when it is in rotation, acts as a generator which thus supplies, for a constant angular velocity $\omega$, a counterelectromotive force proportional to $C_1/i$, thus of the same form as the curve $C_1$ of FIG. 2.

This counterelectromotive force may be used for controlling the switching of the motor. To this, and, in the embodiment of FIG. 3, is applied to the base of a transistor 32 of NPN type whose emitter is connected to earth by means of two resistors 33 and 34. The collector of the transistor 32 is connected to the base of a second transistor 35 of PNP type, whose collector is grounded. The coil 31 is connected, by one end, to the collector of the transistor 32 through a resistor 36.

A capacitor 37 connects the collector of the transistor 32 to the emitter of the transistor 35. A cell 38 feeds the assembly.

The two transistors 32 and 35 act, compared with the voltage at the terminals of the coil 31, as a nonlinear amplifier of the positive half-waves of this voltage. The capacitor 37 is intended to avoid the oscillation of this amplifier.

Referring to FIG. 2, when the motor is freed by the escapement, for example at point $K_1$, it rotates under the effect of its static torque $C_o$.

The assembly is such that the voltage produced in the coil 30 is negative, so that the amplifier is blocked and that the coil 31 is not energized.

When this voltage changes sign, the amplifier passes to saturation and a voltage pulse (of amplitude practically equal to the voltage of the cell) is applied to the coil 31.

The motor is then fed (abscissa point $\pi$) and continues to rotate under the effect of the torque $C_o+C_1$, up to the abscissa point $2\pi$, i.e., until the voltage at the terminals of the coil 30 changes the sign again, so that the energization of the coil 31 ceases. The motor then operates again under the sole effect of the torque $C_o$, up to the stop point $K_2$.

Figure 4:
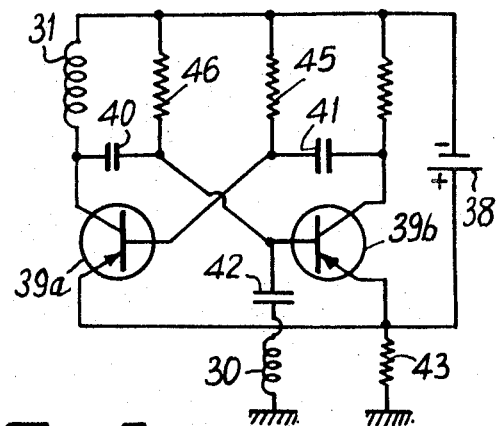
FIG. 4 and 5 show modified embodiments of an electronic switching component of this type.

A second embodiment of an electronic switching of the feed of the motor is illustrated in FIG. 4.

The circuit shown in this FIG. comprises the same coils 30 and 31 as in FIG. 3 and an astable trigger circuit of conventional type. This latter comprises two transistors 39a and 39b; the collector of the transistor 39a is connected to the base of the transistor 39b by a capacitor 40 whilst the collector of the transistor 39b is connected to the base of the transistor 39a by a capacitor 41. The coil 30 feeds the base of the transistor 39 through a capacitor 42. The assembly is completed by resistors 43 and 46 and by a cell 38.

The values of the components of this circuit are determined so that the natural frequency of the trigger circuit is slightly lower than that of the escapement. This trigger circuit will then be synchronized by the voltage at the terminals of the auxiliary coil 30, which, in each cycle, will cause a triggering slightly before the maximum of the natural relaxation oscillation of the assembly. For the negative half-waves of this voltage, which correspond to the time gaps when the motor rotates under the sole effect of the torque $C_o$, the transistor 39b is open, whilst the transistor 39a is blocked, so that the coil 31 is not energized. During the positive half-waves, on the other hand, it is the transistor 39a which is open, so that the coil 31 is energized.

As in the first embodiment defined hereinabove, there is finally a perfect synchronism between the stopping and starting instants of the motor and the intervention of the stops constituted by the blades 16a and 16b of the anchor 14.

Figure 5:
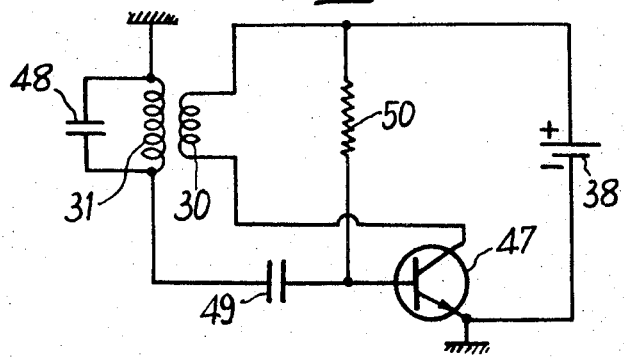

FIG. 5 shows a third embodiment of an electronic switching of the feed of the motor. The assembly shown in FIG. 5 comprises the same coils 30 and 31 as in the two preceding FIGS., which constitute, with the transistor 47, and oscillator assembly of the type known as a "blocking oscillator."

To this end, the two coils are coupled together; the coil 31, at whose terminals is connected a capacitor 48, is connected a capacitor 48, is connected to the base of the transistor by means of a capacitor 49, whilst the coil 30 is connected on the one hand to said base through a resistor 50 and on the other hand to the collector of the transistor.

The values of the components of the circuit are determined so that its natural oscillation frequency is slightly greater than that of the escapement.

Under the action of the AC voltage which is produced at the terminals of the coil 30, as was explained hereinabove, when the motor rotates, the assembly begins to oscillate and the relaxation voltage resulting therefrom at the terminals of the coil 31 is integrated by the capacitor 48 so as to produce a waveform suitable for the energization of the motor. This latter is finally driven at a velocity slightly greater than that which would correspond to the perfect synchronism, defined hereinabove, with the escapement.

This, in fact, does not present any disadvantage: there is, in fact, average synchronism between the motor and the escapement, the motor remaining, from time to time, in abutment on one of the blades of the anchor whilst a control pulse is applied thereto, this enabling the escapement to "catch up on" the motor.

It must be understood that the electronic switching systems described and shown are in no way limiting. It is only important that the switching system used, whether or not it is electronic, is capable of energizing the motor at the suitable instants of the half-periods of operation where said motor produces a torque of motive sign in the desired direction.

It will be mentioned in particular that the blocking oscillator of FIG. 5, or any other relaxation oscillator assembly, could be used according to the same mode of operation as the multivibrator of FIG. 4, i.e., by arranging it so that its natural frequency is slightly lower than that of the escapement and that exact synchronization is produced.

We claim:

1. Clockwork movement comprising an electric motor having a field winding, a source of supply for this motor, switching means connecting this source of supply to said field winding whereby a current flows through the said field winding during predetermined portions of the period of rotation of the motor, an escape wheel, an anchor and a balance-coil spring system cooperating with the escape wheel, and connection gear means between the motor and the escape wheel, said motor comprising first and second motive phases which succeed one another in time, the first one effected by the torque due to the said current during the said predetermined portions and the second under the effect of a static torque due to the presence, inside the motor, of means for generating a permanent magnetic flux, characterized, in combination, in that the motor is of the stepwise rotary type with its static torque having a motive effect for any angular position of its rotor in which the torque, due to the current, is annulled upon change of direction, in that said connection gear means have a ratio such that a half-step of the escape wheel corresponds to one step of the motor, and in that said switching means are arranged in order to effect the switching on and the switching off of the current supply at instants when the rotor of the motor occupies angular positions for which the torque due to the current changes direction.

2. Clockwork movement according to claim 1, in which an elastic coupling of limited stroke connects said gear to the escape wheel, the limitation of stroke being such that the escape wheel brings about the stopping of the motor at one instant of its second motive phase.

3. Clockwork movement according to claim 1, in which said switching means essentially consist of an assembly of alternate conductive and insulating areas, rotated by the motor, and by a conductive brush which connects the source of supply to said assembly.

4. Clockwork movement according to claim 1, in which said switching means essentially consist of an auxiliary coil, coupled to the field winding of the motor and of an electronic switching circuit controlled by the voltage at the terminals of said coil, and connecting the source of supply to the said field winding.

5. Clockwork movement according to claim 4, in which said electronic circuit is a nonlinear amplifier unblocked by the half-waves of a predetermined sign of said voltage.

6. Clockwork movement according to claim 4, in which said electronic circuit is a relaxation oscillator, synchronized by said voltage.

7. Clockwork movement according to claim 4, in which said electronic circuit is a blocking oscillator of natural frequency higher than that of the escapement.